United States Patent [19]

Kyosuke

[11] 4,403,711
[45] Sep. 13, 1983

[54] OIL SPLASH AND FIRE-PROOF LID

[76] Inventor: Kato Kyosuke, 58-22, 4-chome, Onomachi, Kasugai City, Aichi Prefecture, Japan

[21] Appl. No.: 324,014

[22] Filed: Nov. 23, 1981

[51] Int. Cl.³ .............................................. B65D 43/24
[52] U.S. Cl. ............................... 220/335; 220/85 CH; 126/299 C
[58] Field of Search .................. 220/85 CH, 334, 335; 126/299 C, 373, 389, 300, 381, 382, 214 D; 99/403; 16/135, 191, 143, 139, 82

[56] References Cited

U.S. PATENT DOCUMENTS

| | | | |
|---|---|---|---|
| 498,569 | 5/1893 | Peterson | 220/85 CH |
| 2,350,243 | 5/1944 | MacKay | 126/299 C |
| 4,258,694 | 3/1981 | Kato | 126/299 C |
| 4,266,527 | 5/1981 | Kato | 126/299 C |

*Primary Examiner*—George T. Hall
*Attorney, Agent, or Firm*—Fred Philpitt

[57] ABSTRACT

A lid that covers an entire opening surface of a cooking pan for frying is formed with a transparent window portion that permits the see-through of the inside of the pan, and the lid is provided with a mounting mechanism so as to be mountable on the cooking pan without any fabrication for fitting on the cooking pan, and the lid is also provided with a gas ventilating mechanism for providing a gap to ventilate the gas along the curved opening edge of the cooking pan proper and the lid to capture almost completely the oil splash moving straight forward in the lid mounted condition by utilizing the straight forwardness of the oil splash occurring in the cooking pan and the curved forwardness of the gas, and the lid is provided with an opening/closing mechanism for allowing the lid to be mounted on the cooking pan proper by keeping the narrow gap for preventing a fire from occurring by keeping the oxygen short condition in the cooking pan when the lid is mounted thereof between the opening edge of the pan proper and the lid.

1 Claim, 7 Drawing Figures

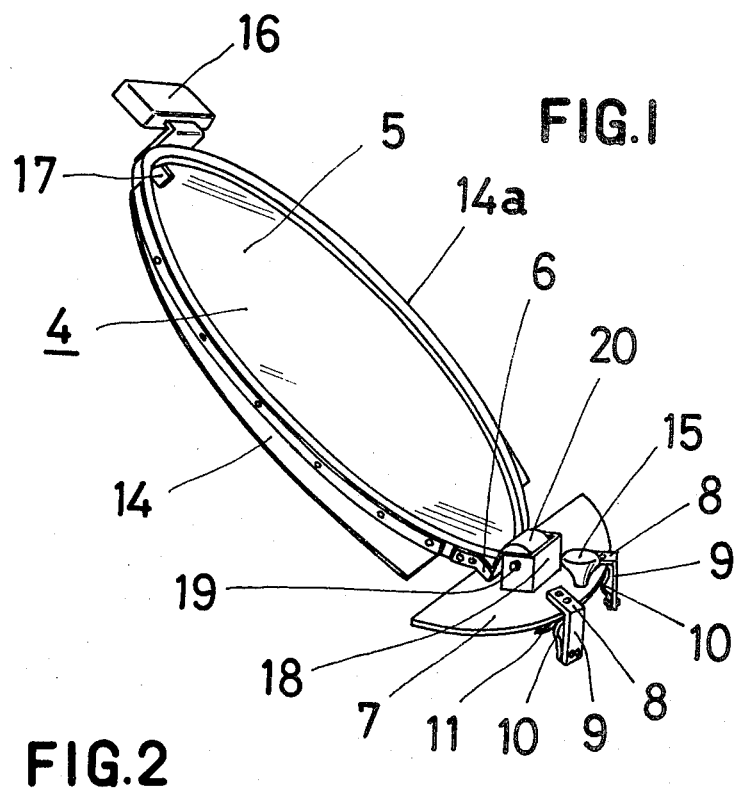
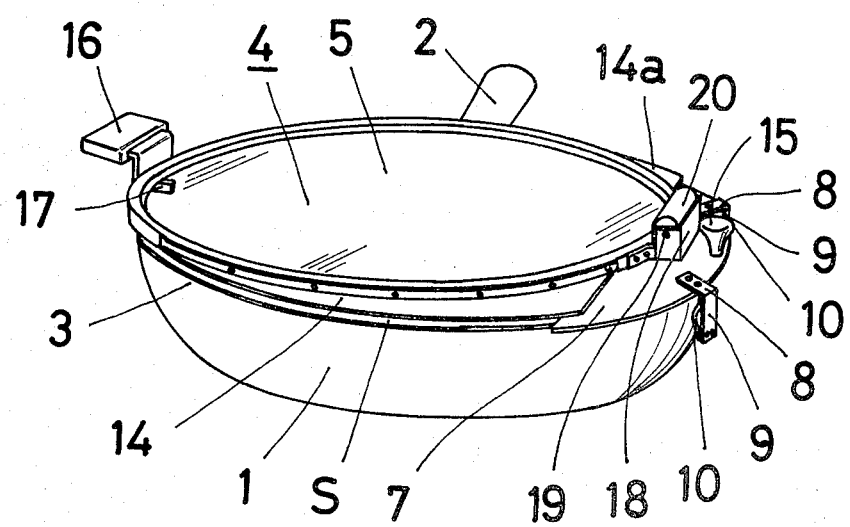

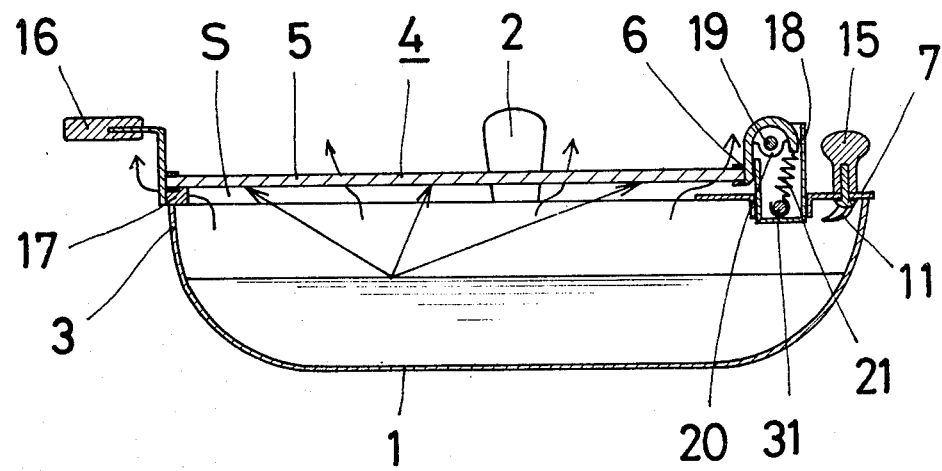
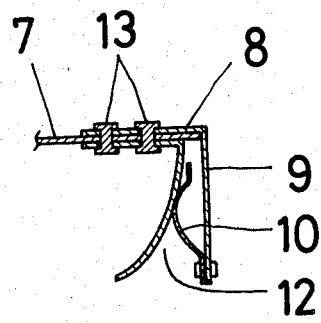
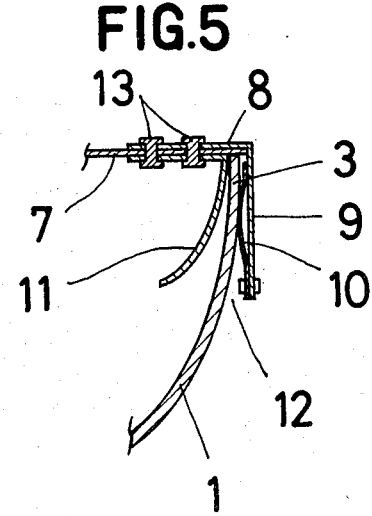

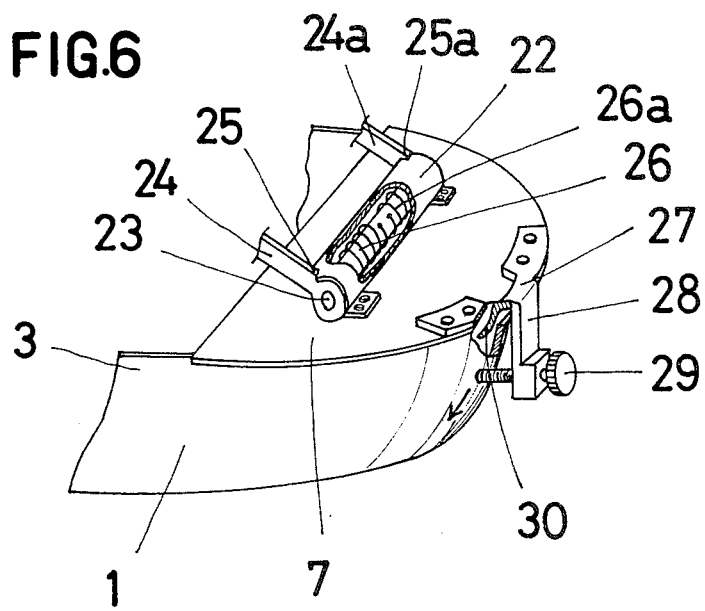
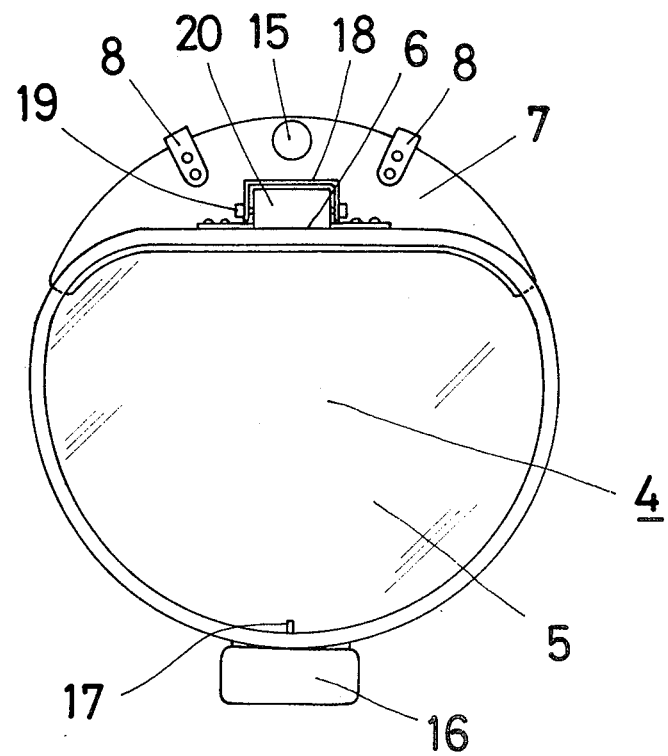

OIL SPLASH AND FIRE-PROOF LID

BACKGROUND OF THE INVENTION

Heretofore, in case of frying foodstuff in the edible oil, as a means for the prevention of the oil splash during the frying and of fire as the result of fire getting in the oil, the preferable means is to place the lid on the cooking pan, but the following drawbacks are found.

When the lid is mounted on the cooking pan, assuring the prevention of fire getting in the oil and eliminating the danger of fire on account of the oxygen shortage in the pan, but if the lid is opaque, the inside of the pan cannot be seen from the outside, and therefore the lid is required to be of a transparent type, but when a large quantity of the steam occurs in the pan, the inside becomes dim instantly even if the transparent lid is used, which results in spoilage of the inside observing function, and therefore is not practical.

Under the circumstances, the inventor's invention was laid open to public by the U.S. Pat. No. 4,266,527 and No. 4,258,694 as the prior arts. His inventions satisfied the practicality of each point, namely, the observation of inside of the cooking pan is possible; the provision of a gas ventilating mechanism between the lid and the opening edge of the pan to provide the gap when the lid is mounted by utilizing skillfully the straight forwardness of the oil splash occurring inside of the pan and the curved forwardness of the gas; and the provision of the opening/closing mechanism that is convenient for practical purpose; and the lid is easily mountable on the pan.

However, a thing in common for both the prior arts is an inconvenience that the combination of lid and pan is previously limited because an engaging mechanism of the lid and pan is specified. Namely, in the U.S. Pat. No. 4,258,694, the U-cross section connection portion for receiving the coupling at the side of the pan in case the bearing plate of the lid is fixed to the pan or the engaging projection is provided, and they are essential conditions for the construction indispensable for the working of this invention, Under the circumstances, the inventer has developed a further device for improving the practicality on the lid with a view to preventing oil splash and fire from occurring.

The shallow pan having an opening edge shape as shown in the drawing is used for primarily frying the foodstuff, but is the pan whose degree of utility is the highest as the utensils in the household, and it seems no household that has not the frying pan in the kitchen. For this reason, in the ordinary households, since the frying pan is always handy, there is no need of taking out a separate exclusive frying pan, and there is a tendency that the frying pan is used for other types of cooking using the oils so that the problems of prevention of violent oil splash or fire involved with the mode of utilization of such shallow pan must be solved.

This means that from the technical viewpoint, it intends to provide a mounting mechanism for mounting the lid on the frying pan with a simple operation without any particular fabrication to the opening edge portion at the frying pan side.

SUMMARY OF THE INVENTION

This invention is to provide a mounting mechanism for detachably mounting a lid over the opening edge portion of a shallow pan for frying without any particular fabrication to be opening edge portion of the shallow frying pan.

This invention is to prevent the oil from splashing in the frying pan by the lid covering the entirety of the opening surface of the shallow frying pan.

An object of this invention is to provide a gas ventilating mechanism formed to allow the gas to pass in curved mode through the gap formed between the lid and the opening edge of the frying pan proper by the lid covering the entirety of the opening surface of the shallow frying pan, and is to permit the see-through observation of the inside of the frying path.

Another object of this invention is to allow the lid to be openable by an opening/closing mechanism for the lid, and the gap provided between the lid and the opening edge of the frying pan proper in the lid closed condition is formed to be of a minimum size so as to prevent the inflow of the air from the outside, and to promote the oxygen short condition in the frying pan and is made to be useful for the prevention of the fire from occurring.

BRIEF DESCRIPTION OF THE DRAWINGS

FIG. 1 is a perspective view of the lid, and FIG. 2 is a perspective view of the lid in closed condition over the shallow frying pan, and FIG. 3 is a side view of the cross section in the center portion in FIG. 2, and FIG. 4 is a cross section showing a mounting mechanism of the bearing plate on the lid over the frying pan, and FIG. 5 is a cross section showing the lid in the mounting condition over the frying pan in FIG. 4, and FIG. 6 is a separate embodiment of the mounting mechanism of the lid over the frying pan and the spring portion in the opening/closing mechanism of the lid, and FIG. 7 is a plan in the embodiment formed by expanding the see-through window portion in the lid to the opening edge of the frying pan.

DETAILED DESCRIPTION OF THE INVENTION

The frying pan proper (1) is of shallow bottom shape, and a handle (2) is projected at a proper location of its opening edge, and is to be used for frying the foodstuff as its primary purpose, and this frying pan proper (1) is used in normal form by leaving the opening surface in open condition, but when a lid (4) which is the separate member is arranged to be detachably mounted over the frying pan, the frying pan can be suited for frying the foodstuff such as tempura while the shallow frying pan is primarily for frying the frizzled boiled rice.

The lid (4) is provided with the mounting mechanism, and the gas exhausting mechanism provided on the opening edge portion (3) of the frying pan proper (1) at the ventilating gap (S) in the lid mounted condition, and the opening/closing mechanism for opening/closing the lid (4).

The lid (4) is provided with the ventilating mechanism, and in the relationship with the frying pan (1), it is formed with the transparent window portion (5) which is made of the heat resistant glass and the like, and the inside of the frying pan proper (1) is arranged to be seen through, and a swiveling arm member (6) is projected and is integral with the lid (4) and its width being broader than one end side, and this arm member is continuous with the opening/closing mechanism having a bearing plate (7), and the lid (4) is swivellably supported by centering around the bearing plate (7) as a fulcrum.

Since the see-through window portion (5) is made as a small diameter with respect to the diameter of the opening portion of the frying pan, bulged flange plates (14) and (14a) are projected at right and left sides.

The mounting mechanism of the lid (4) is constructed in such a way as shown in FIG. 4 that a bent member (8) which is bent in L-shape abuts on the upper surface at corresponding positions of the rear end edges of the bearing plate (7), for example, two locations, and ⊐-shape metal member (11) is disposed on the undersurface of the abutted portion immediately below the bearing plate (7), and the resulting three-layer member is integrally caulked to be fixed. The corresponding space of the perpendicular portion (9) of the bent member (8) and the ⊐-shape metal member forms a fitting portion (12) that engaged the edge portion (3) of the opening portion of the frying pan proper (1), and the spring member (10) of curved shape fixed to the corresponding surface of the perpendicular portion (9) of the bent member (8) retains the fitting condition of the frying pan (1) firmly. Reference numeral (15) denotes a gripping knob for detaching operation.

The lid (4) is formed to a size and shape so that the peripheral edge of the lid (4) provides a small ventilating gap (S) on the immediately above the peripheral edge of the opening of the frying pan proper (1), and when the opening surface of the frying pan proper (1) is covered by the lid (4), as shown in FIGS. 2 and 3, all the oil splashes are retained in the frying pan (1) by utilizing the straight forwardness of the oil splash generating from the inside of the frying pan (1) and at the same time, the gases such as the steam or the oil fume rising from the inside of the frying pan are ventilated through the ventilating gap (S) by utilizing the curved forwardness of the gases.

The reference numeral (16) denotes a handle projecting on the other end of the opening/closing fulcrum in the lid (4), and a stopper (17) is provided on its lower surface, and is arranged to abut on the upper edge of the opening of the frying pan (1) to be static whereby the ventilating gap (S) is formed.

The opening/closing mechanism of the swiveling arm member (6) in the bearing plate (7) mounted on the lid swivellably to stop the lid at an optional opening angle when the lid is open by balancing the own weight of the lid (4) and the elastic force of the spring, and when the lid is closed, the ventilating gap (S) is retained.

The opening/closing mechanism is described by enumerating the first embodiment as shown in FIG. 3 and the second embodiment as shown in FIG. 6.

In the first place, in the first embodiment of FIG. 3, the bearing frame (18) is mounted on the upper surface of the bearing plate (7), and the support shaft (19) is rotatably mounted and supported in the horizontal direction of the bearing frame (18), and the compression spring (21) is mounted between the rear end of the rotary tube portion (20) and the lateral lever (31) in the lower part of the bearing frame (18), and the resilient force of the compression spring (21) and the own weight of the lid (4) are balanced by the selection of the constant of the spring (21).

Next, in the second embodiment of FIG. 6, base end portions of swivelling arm members (24) and (24a) of the lid (4) are integrally coupled to the projecting portions of both ends of the rotary shaft (23) pivotally fixed to the right and left bearing portions (22) which are fixed on the upper surface of the bearing plate (7), and the opening angle of the lid (4) is controlled by guide concave portions (25) and (25a) formed on the corresponding surfaces in the bearing portions (22). Between the bearing portions (22) fixed to the rotary shaft (23), the coil springs (26) and (26a) are installed symmetrically, and the resilient forces of the coil springs (26) and (26a) are respectively caused to work in the direction of balancing the own weight of the lid (4).

In the mounting mechanism of the lid (4), in connection with the first embodiment shown in FIGS. 1–5, the second embodiment of the mounting mechanism is illustrated in FIG. 6. The stationary metal fixture (27) is fixed in the condition where the metal fixture is urged against the holding plate (30) which is previously mounted perpendicularly on the corresponding surface by the screwing of the clamping screw (29) screwed on the lower end portion of the perpendicular portion (28). In this case, as the contact of the tip of the clamping screw (29) with the frying pan proper (1) descends, as shown by the arrow mark, along the inclination of the frying pan by the clamping of the clamping screw, the bearing plate (7) is strongly fixed.

FIG. 7 shows an embodiment in which the transparent window portion (5) in the lid (4) shown in FIGS. 1–3 is expanded as long as possible, and other elements of the embodiment in the construction are all in common to those of the embodiments shown previously.

As this invention has the foregoing construction, it brings about the effects of expanding the range of utilization of the frying pan having the oil splash and fire preventing effects because this invention permits the easy mounting of the lid (4) as long as the diameters of the lid and the opening portion of the pan are almost identical on the shallow pan to which no fabrication is applied and no specific combination is applied which forms the structural portions to accommodate the lid (4) previously as disclosed in the U.S. Pat. No. 4,266,527 and No. 4,358,694 as the prior arts in order to meet conditions at kitchen of the household where only one shallow pan is available for both cookings using the oils as mentioned previously, namely, the frying pan (1) for frying the frizzled boiled rice is doubled for frying the tempura in the hot oil bath.

By the way, the mounting mechanism of the lid over the frying pan proper is not related to the handle of the frying pan so that it is obvious that the product of this invention can be mounted on the ordinary type pan provided with the two handles at symmetrical locations not shown in the drawings as the oil splash preventing lid, and this embodiment too belongs to the scope of this invention.

What is claimed is:

1. An oil splash and fire-proof lid arrangement that can be detachably mounted on the side of a shallow cooking or frying pan, which arrangement comprises:
(a) a bearing plate having an outer arcuate edge portion that approximates a portion of the outer periphery of the pan,
(b) means for detachably mounting said bearing plate on the side of the pan so that the bearing plate will be disposed parallel to the bottom of the pan regardless of the position of the lid,
(c) a lid member pivotally attached to said bearing plate by a pivotal mounting member so that said lid member can be pivoted from a lowermost position that is approximately parallel to the bottom of the pan to a raised position which permits access to the contents of the pan, said lid member comprising see-through, heat-resistant material, and
(d) means on said lid member for establishing a ventilating gap between the lid member and the upper rim of the pan when said lid member is pivoted downwardly to its lowermost position.

* * * * *